United States Patent
Elefritz, Jr. et al.

(10) Patent No.: US 7,344,643 B2
(45) Date of Patent: Mar. 18, 2008

(54) PROCESS TO ENHANCE PHOSPHORUS REMOVAL FOR ACTIVATED SLUDGE WASTEWATER TREATMENT SYSTEMS

(75) Inventors: Robert A. Elefritz, Jr., Ormond Beach, FL (US); Dennis J. Barnes, West Allis, WI (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 152 days.

(21) Appl. No.: 11/170,864

(22) Filed: Jun. 30, 2005

(65) Prior Publication Data
US 2007/0000836 A1    Jan. 4, 2007

(51) Int. Cl.
C02F 3/00    (2006.01)

(52) U.S. Cl. .................. 210/607; 210/620; 210/626

(58) Field of Classification Search ............ 210/607, 210/620–626
See application file for complete search history.

(56) References Cited

U.S. PATENT DOCUMENTS

| | | | |
|---|---|---|---|
| 2,893,957 | A | 7/1959 | Genter et al. |
| 3,047,492 | A | 7/1962 | Gambrel |
| 3,192,155 | A | 6/1965 | Bready et al. |
| 3,259,566 | A | 7/1966 | Torpey |
| 3,617,540 | A | 11/1971 | Bishop et al. |
| 3,756,946 | A | 9/1973 | Levin et al. |
| 3,787,316 | A | 1/1974 | Brink et al. |
| 3,907,672 | A | 9/1975 | Milne |
| 3,964,998 | A | 6/1976 | Barnard |
| 4,042,493 | A | 8/1977 | Matsch et al. |
| 4,056,465 | A | 11/1977 | Spector |
| 4,132,638 | A | 1/1979 | Carlsson |
| 4,141,822 | A | 2/1979 | Levin et al. |
| 4,160,724 | A | 7/1979 | Laughton |
| 4,162,153 | A | 7/1979 | Spector |
| 4,271,026 | A | 6/1981 | Chen et al. |
| 4,277,342 | A | 7/1981 | Hayes et al. |
| 4,279,753 | A | 7/1981 | Nielson et al. |
| 4,284,510 | A | 8/1981 | Savard et al. |

(Continued)

FOREIGN PATENT DOCUMENTS

DE    4 238 708    5/1994

(Continued)

OTHER PUBLICATIONS

Worthen, Peter T., "The Chesapeake Bay Plan: Restoring An Estuary In Distress," *Water Engineering & Management*, Sep. 1994, pp. 18-22, vol. 141, No. 9, ABI/INFORM Global.

(Continued)

*Primary Examiner*—Chester T. Barry

(57) ABSTRACT

Contaminated wastewaters comprising biochemical oxygen demand (BOD), nitrogen and phosphorus are treated by an activated sludge process. The process utilizes an activated sludge tank, a solid-liquid separator, and a bioreactor to significantly reduce, or eliminate, waste activated sludge (WAS) within a sludge stream. A sidestream reactor is employed downstream from the bioreactor to remove soluble phosphates left in the sludge stream by the low WAS process. Within the sidestream reactor, a source of multivalent metal ions is added to a slightly alkaline sludge stream to precipitate the phosphates. The solid phosphates have a specific gravity higher than that of the organic matter in the sludge stream and may be separated from the sludge stream based upon differential settling velocity.

47 Claims, 5 Drawing Sheets

U.S. PATENT DOCUMENTS

| | | | |
|---|---|---|---|
| 4,323,367 A | 4/1982 | Ghosh | |
| 4,351,729 A | 9/1982 | Witt | |
| 4,370,233 A | 1/1983 | Hayes et al. | |
| 4,374,730 A | 2/1983 | Braha et al. | |
| 4,407,717 A | 10/1983 | Teletzke et al. | |
| 4,491,522 A | 1/1985 | Ishida et al. | |
| 4,522,722 A | 6/1985 | Nicholas | |
| 4,527,947 A | 7/1985 | Elliott | |
| 4,537,682 A | 8/1985 | Wong-Chong | |
| 4,568,457 A | 2/1986 | Sullivan | |
| 4,568,462 A | 2/1986 | Bohnke et al. | |
| 4,599,167 A | 7/1986 | Benjes et al. | |
| 4,632,758 A | 12/1986 | Whittle | |
| 4,643,830 A | 2/1987 | Reid | |
| RE32,429 E | 6/1987 | Spector | |
| 4,675,114 A | 6/1987 | Zagyvai et al. | |
| 4,705,633 A | 11/1987 | Bogusch | |
| 4,731,185 A | 3/1988 | Chen et al. | |
| 4,780,198 A | 10/1988 | Crawford et al. | |
| 4,790,939 A | 12/1988 | Suzuki et al. | |
| 4,797,212 A | 1/1989 | Von Nordenskjold | |
| 4,818,391 A | 4/1989 | Love | |
| 4,842,732 A | 6/1989 | Tharp | |
| 4,849,108 A | 7/1989 | De Wilde et al. | |
| 4,867,883 A | 9/1989 | Daigger et al. | |
| 4,874,519 A | 10/1989 | Williamson | |
| 4,891,136 A | 1/1990 | Voyt | |
| 4,915,840 A | 4/1990 | Rozich | |
| 4,956,094 A | 9/1990 | Levin et al. | |
| 4,961,854 A | 10/1990 | Wittmann et al. | |
| 4,975,197 A | 12/1990 | Wittmann et al. | |
| 4,999,111 A | 3/1991 | Williamson | |
| 5,013,442 A | 5/1991 | Davis et al. | |
| 5,019,266 A | 5/1991 | Soeder et al. | |
| 5,022,993 A | 6/1991 | Williamson | |
| 5,051,191 A | 9/1991 | Rasmussen et al. | |
| 5,094,752 A | 3/1992 | Davis et al. | |
| 5,098,567 A | 3/1992 | Nishiguchi | |
| 5,114,587 A | 5/1992 | Hagerstedt | |
| 5,126,049 A | 6/1992 | Hallberg | |
| 5,128,040 A | 7/1992 | Molof et al. | |
| 5,137,636 A | 8/1992 | Bundgaard | |
| 5,151,187 A | 9/1992 | Behmann | |
| 5,182,021 A | 1/1993 | Spector | |
| 5,234,595 A | 8/1993 | DiGregorio et al. | |
| 5,246,585 A | 9/1993 | Meiring | |
| 5,254,253 A | 10/1993 | Behmann | |
| 5,288,405 A | 2/1994 | Lamb, III | |
| 5,288,406 A | 2/1994 | Stein | |
| 5,304,308 A | 4/1994 | Tsumura et al. | |
| 5,316,682 A | 5/1994 | Keyser et al. | |
| 5,336,290 A | 8/1994 | Jermstad | |
| 5,342,522 A | 8/1994 | Marsman et al. | |
| 5,348,653 A | 9/1994 | Rovel | |
| 5,348,655 A | 9/1994 | Simas et al. | |
| 5,356,537 A | 10/1994 | Thurmond et al. | |
| 5,376,242 A | 12/1994 | Hayakawa | |
| 5,380,438 A | 1/1995 | Nungesser | |
| 5,389,258 A | 2/1995 | Smis et al. | |
| 5,480,548 A | 1/1996 | Daigger et al. | |
| 5,482,630 A | 1/1996 | Lee et al. | |
| 5,505,862 A | 4/1996 | Sonnenrein | |
| 5,514,277 A | 5/1996 | Khudenko | |
| 5,514,278 A | 5/1996 | Khudenko | |
| 5,531,896 A | 7/1996 | Tambo et al. | |
| 5,543,051 A | 8/1996 | Harris | |
| 5,543,063 A | 8/1996 | Walker et al. | |
| 5,582,734 A | 12/1996 | Coleman et al. | |
| 5,601,719 A | 2/1997 | Hawkins et al. | |
| 5,611,927 A | 3/1997 | Schmid | |
| 5,624,562 A | 4/1997 | Scroggins | |
| 5,624,565 A | 4/1997 | Lefevre et al. | |
| 5,626,755 A | 5/1997 | Keyser et al. | |
| 5,650,069 A | 7/1997 | Hong et al. | |
| 5,651,891 A | 7/1997 | Molof et al. | |
| 5,658,458 A | 8/1997 | Keyser et al. | |
| 5,725,772 A | 3/1998 | Shirodkar | |
| 5,733,455 A | 3/1998 | Molof et al. | |
| 5,733,456 A | 3/1998 | Okey et al. | |
| 5,746,919 A | 5/1998 | Dague et al. | |
| 5,773,526 A | 6/1998 | Van Dijk et al. | |
| 5,811,008 A | 9/1998 | Von Nordenskjold | |
| 5,818,412 A | 10/1998 | Maekawa | |
| 5,824,222 A | 10/1998 | Keyser et al. | |
| 5,833,856 A | 11/1998 | Liu et al. | |
| 5,846,424 A | 12/1998 | Khudenko | |
| 5,853,588 A | 12/1998 | Molof et al. | |
| 5,858,222 A | 1/1999 | Shibata et al. | |
| 5,919,367 A | 7/1999 | Khudenko | |
| 5,989,428 A | 11/1999 | Goronszy | |
| 5,993,503 A | 11/1999 | Kruidhof | |
| 6,004,463 A | 12/1999 | Swett | |
| 6,015,496 A | 1/2000 | Khudenko | |
| 6,036,862 A | 3/2000 | Stover | |
| 6,039,874 A | 3/2000 | Teran et al. | |
| 6,047,768 A | 4/2000 | Buehler, III | |
| 6,054,044 A | 4/2000 | Hoffland et al. | |
| 6,066,256 A | 5/2000 | Henry et al. | |
| 6,077,430 A | 6/2000 | Chudoba et al. | |
| 6,113,788 A | 9/2000 | Molof et al. | |
| 6,117,323 A | 9/2000 | Haggerty | |
| 6,193,889 B1 | 2/2001 | Teran et al. | |
| 6,352,643 B1 | 3/2002 | Kwon et al. | |
| 6,383,387 B2 | 5/2002 | Hasegawa et al. | |
| 6,454,949 B1 | 9/2002 | Sesay et al. | |
| 6,527,956 B1 | 3/2003 | Lefevre et al. | |
| 6,555,002 B2 | 4/2003 | Garcia et al. | |
| 6,562,237 B1 | 5/2003 | Olaopa | |
| 6,585,895 B2 | 7/2003 | Smith et al. | |
| 6,592,762 B2 | 7/2003 | Smith | |
| 6,605,220 B2 | 8/2003 | Garcia et al. | |
| 6,613,238 B2 | 9/2003 | Schloss | |
| 6,630,067 B2 | 10/2003 | Shieh et al. | |
| 6,660,163 B2 | 12/2003 | Miklos | |
| 6,706,185 B2 | 3/2004 | Goel et al. | |
| 6,712,970 B1 | 3/2004 | Trivedi | |
| 6,783,679 B1 | 8/2004 | Rozich | |
| 6,787,035 B2 | 9/2004 | Wang | |
| 6,805,806 B2 | 10/2004 | Arnaud | |
| 6,814,868 B2 | 11/2004 | Phagoo et al. | |
| 6,833,074 B2 | 12/2004 | Miklos | |
| 6,863,818 B2 | 3/2005 | Daigger et al. | |
| 6,884,355 B2 | 4/2005 | Kamiya et al. | |
| 6,893,567 B1 | 5/2005 | Vanotti et al. | |
| 7,105,091 B2 | 9/2006 | Miklos | |
| 7,208,090 B2 | 4/2007 | Applegate et al. | |
| 2001/0045390 A1 | 11/2001 | Kim et al. | |
| 2004/0016698 A1 | 1/2004 | Unger | |
| 2005/0040103 A1 | 2/2005 | Abu-Orf et al. | |
| 2005/0045557 A1 | 3/2005 | Daigger et al. | |
| 2006/0113243 A1 | 6/2006 | Applegate et al. | |

FOREIGN PATENT DOCUMENTS

| | | |
|---|---|---|
| DE | 4444335 | 6/1996 |
| EP | 0106043 | 4/1984 |
| EP | 0 408 878 | 1/1991 |
| EP | 0 440 996 | 8/1991 |
| EP | 1 236 686 | 9/2002 |
| GB | 2 006 743 | 5/1979 |
| JP | 59032999 | 2/1984 |
| JP | 59052597 | 3/1984 |
| JP | 60-84199 | 5/1985 |
| JP | 61192389 | 8/1986 |

| | | |
|---|---|---|
| JP | 63130197 | 6/1988 |
| JP | 62138986 | 12/1988 |
| JP | 63302996 | 12/1988 |
| JP | 01174949 | 2/1991 |
| JP | 3042019 | 2/1991 |
| JP | 6091285 | 4/1994 |
| JP | P2000-199086 | 7/2000 |
| JP | 2000210542 | 8/2000 |
| NL | 9301791 | 10/1993 |
| RU | 1 596 752 | 9/1995 |
| WO | WO 93/15026 | 8/1993 |
| WO | WO 94/24055 | 10/1994 |
| WO | WO 03/072512 | 9/2003 |

OTHER PUBLICATIONS

"Contrashear filter solutions for waste water," for Contra Shear™, Jul. 29, 2005, p. 1 of 1, http://www.contrashear.co.nz/.

"Efficient treatment of high strength industrial and municipal wastewater" brochure by Envirex Inc., Jan. 1990.

"GAC Fluid Bed Efficient, economical bioremediation of BTEX groundwater" brochure by Envirex Inc., Dec. 1992.

"Internally-fed Rotary Wedgewire Screens" brochure by Parkson Corporation for Hycor® Rotoshear® (year not provided).

"Rex VLR/SCC System" brochure by Envirex Inc., Bulletin No. 315-156, Oct. 1989.

"The Rotoscreen™ Escalating Fine Channel Screen Builds Pre-Coat to Provide High Solids Capture Rates with the Lowest Headloss," Jul. 29, 2005, p. 1 of 2-page screen, Parkson Corporation Web Home Page, http://www.parkson.com/Content.aspx?ntopicid=120&parent=process&processID=148.

"The Rotoshear® Internally Fed Rotating Drum Screen's Wedgewire Construction Maximizes Capture for Efficient Screening with Minimal Operator Attention," Jul. 29, 2005, p. 1 of 2-page screen, Parkson Corporation Web Home Page, http://www.parkson.com/Content.aspx?ntopicid=133&parent=municipal&processID=149 . . . .

"Vertical loop reactors—fine bubble power efficiency without fine bubble maintenance" brochure by Envirex Inc., Jan. 1986.

Table 8-25, Description of Suspended Growth Processes for Phosphorus Removal, Wastewater Engineering Treatment and Reuse (Fourth Ed.), Metcalf & Eddy, McGraw Hill 2003, p. 810.

Wastewater Engineering Treatment and Reuse (Fourth Edition), Metcalf & Eddy, McGraw Hill 2003, pp. 811-813.

Microrganisms and Their Role in the Activated-Sludge Process, Hyperion Treatment Plant (Playa Del Rey, California), http://www.college.ucla.edu/webproject/micro7/studentprojects7/Rader/asludge2.htm, pp. 1-19, (Accessed Jan. 11, 2005).

Bernd, Heinzmann and Gerd Engel, Phosphorus Recycling in Treatment Plants with Biological Phosphorus Removal, presented at the German Federal Environment Ministry, Feb. 6-7, 2003, Berlin, pp. 1-16.

Chen, et al., Minimization of Activated Sludge Production by Chemically Stimulated Energy Spilling, Water Science and Technology, vol. 42, No. 12, 2000, pp. 189-200.

Yasui, et al., A Full-Scale Operation of a Novel Activated Sludge Process without Excess Sludge Production, Water Science and Technology, vol. 34, No. 3-4, 1996, pp. 395-404.

Chen et al., Effect of Sludge Fasting/Feasting on Growth of Activated Sludge Cultures, Water. Res., vol. 35, No. 4, 2001, pp. 1029-1037.

Hong, et al., Biological Phosphorus and Nitrogen Removal via the A/O Process: Recent Experience in the United States and United Kingdom, Water Science and Technology, vol. 16, Vienna, 1984, pp. 151-172.

Chudoba, et al., The Aspect of Energetic Uncoupling of Microbial Growth in the Activated Sludge Process-OSA System, Water Science and Technology, vol. 26, No. 9-11, 1992, pp. 2477-2480.

Strand, et al., Activated-Sludge Yield Reduction Using Chemical Uncouplers, Water Environment Research, vol. 71, No. 4, pp. 454-458, 1999.

Yasui, et al., An Innovative Approach to Reduce Excess Sludge Production in the Activated Sludge Process, Water Science and Technology, vol. 30, No. 9, 1994, pp. 11-20.

Van Loosdrecht, et al., Maintenance, Endogeneous Respiration, Lysis, Decay and Predation, Water Science and Technology, vol. 39, No. 1, 1999, pp. 107-117.

Low, et al., The Use of Chemical Uncouplers for Reducing Biomass Production During Biodegradation, Water Science and Technology, vol. 37, No. 4-5, 1998, pp. 399-402.

Harrison, et al., Transient Responses of Facultatively Anaerobic Bacteria Growing in Chemostat Culture to a Change from Anaerobic to Aerobic Conditions, Journal of General Microbiology, 1971, 68, pp. 45-52.

Ekama, et al., Considerations in the Process of Nutrient Removal Activated Sludge Processes, Water Science and Technology, vol. 15, Capetown, 1983, pp. 283-318.

Marais, et al., Observations Supporting Phosphate Removal by Biological Excess Uptake—A Review, Water Science and Technology, vol. 15, Capetown, 1983, pp. 15-41.

Westgarth, et al., Anaerobiosis in the Activated-Sludge Process, Department of Environmental Sciences and Engineering, School of Public Health, University of NC, Chapel Hill, pp. 43-61., 1964.

Cecchi, et al., Anaerobic Digestion of Municipal Solid Waste, BioCycle, vol. 31, No. 6, Jun. 1990, pp. 42-43.

Casey, et al., A Hypothesis for the Causes and Control of Anoxic-Aerobic (AA) Filament Bulking in Nutrient Removal Activated Sludge Systems, Water Science and Technology, vol. 29, No. 7, 1994, pp. 203-212.

Fukase, et al., Factors Affecting Biological Removal of Phosphorus, Water Science and Technology, vol. 17, Nos. 11/12, 1985, pp. 187-198.

Adams, et al., Enzymes from Microorganisms in Extreme Environments, Chemical & Engineering News, vol. 73, No. 51, 1995, pp. 32-42.

Nielsen, The Significance of Microbial FE (III) Reduction in the Activated Sludge Process, Water Science and Technology, vol. 34, Nos. 5-6, 1996, pp. 129-136.

Valentis, et al., Wastewater Treatment by Attached-Growth Micro-Organisms on a Geotextile Support, Water Science and Technology, vol. 22, Nos. 1/2, 1990, pp. 43-51.

Wentzel, et al., Processes and Modelling of Nitrification Denitrification Biological Excess Phosphorus Removal Systems—A Review, Water Science and Technology, vol. 25, No. 6, 1992, pp. 59-82.

Matsuo, et al., Metabolism of Organic Substances in Anaerobic Phase of Biological Phosphate Uptake Process, Water Science and Technology, vol. 25, No. 6, 1992, pp. 83-92.

Charpentier, et al., "ORP Regulation and Activated Sludge 15 years of Experience," 19th Biennial Conference/AWQ of Vancouver—Jun. 1998.

Klopping, et al., "Activated Sludge Microbiology, Filamentous and Non-Filamentous Microbiological Problems and Biological Nutrient Removal," Water Environment Federation, Plant Operations Specialty Conference, Date Unknown.

Caulet, et al., "Modulated Aeration Management by Combined ORP and DO Control: A Guarantee of Quality and Power Savings for Carbon and Nitrogen Removal in Full Scale Wastewater Treatment Plants," Center of International Research for Water Environment, France, 1999.

Chudoba, et al., "Pre-Denitrification Performance of a High-Loaded Anoxic Sludge," Degremont Research Center, France, 1999.

RA, et al., "Biological Nutrient Removal with an Internal Organic Carbon Source in Piggery Wastewater Treatment," *Water Research*, vol. 34 No. 3, pp. 965-973, 2000.

Kim, et al., "pH and Oxidation-Reduction Potential Control Strategy for Optimization of Nitrogen Removal in an Alternating Aerobic-Anoxic System," *Water Environment Research*, vol. 73, No. 1, 2001.

Abu-Orf, M. M., et al., "Chemical and Physical Pretreatment of ATAD Biosolids for Dewatering," *Water Science Technology*, 2001, vol. 44, No. 10, pp. 309-314, IWA Publishing.

Bakker, E. P., Chapter IIA, "Cell $K^+$ and $K^+$Transport Systems in Prokaryotes," *In Alkali Cation Transport Systems in Prokaryotes*, Bakker, E.P., Ed., 1993, pp. 205-224, CRC Press.

Bishop, P. L., et al., "Fate of Nutrients during Aerobic Digestion," *Journal Environ. Eng. Div., Proc. Am. Soc. Civil Eng.*, 1978, vol. 104 No. EE5, pp. 967-979.

Bruus, J. H., et al., "On the Stability of Activated Sludge Flocs with Implications to Dewatering," *Water Research*, 1992, vol. 26, No. 12 pp. 1597-1604, Pergamon Press Ltd.

Dignac, M.-F., et al., "Chemical Description of Extracellular Polymers: Implication on Activated Sludge Floc Structure," *Water Science Technology*, 1998, vol. 38, No. 8-9, pp. 45-53, Elsevier Science Ltd.

Dubois, M., et al., "Colorimetric Method for Determination of Sugars and Related Substances," *Analytical Chemistry*, 1956, vol. 28, No. 3, pp. 350-356.

FrØlund, B., et al., "Extraction of Extracellular Polymers from Activated Sludge Using a Cation Exchange Resin," *Water Research*, 1996, vol. 30, No. 8, pp. 1749-1758, Elsevier Science Ltd.

Hartree, E. F., "Determination of Protein: A Modification of the Lowry Method that Gives a Linear Photometric Response," *Analytical Biochemistry*, 1972, vol. 48, pp. 422-427, Academic Press, Inc.

Higgins, M. J., et al., "Characterization of Exocellular Protein and Its Role in Bioflocculation," *Journal of Environmental Engineering*, 1997, vol. 123, pp. 479-485.

Higgins, M. J., et al., "The Effect of Cations on the Settling and Dewatering of Activated Sludges: Laboratory Results," *Water Environment Research*, 1997, vol. 69, No. 2, pp. 215-224.

Kakii, K., et al., "Effect of Calcium Ion on Sludge Characteristics," *J. Ferment. Technol.*, 1985, vol. 63, No. 3, pp. 263-270.

Lowry, O. H., et al., "Protein Measurement with the Folin Phenol Reagent," *J. Bio. Chem.*, 1951, vol. 193, pp. 265-275.

Mahmoud, N., et al., "Anaerobic Stabilisation and Conversion of Biopolymers in Primary Sludge -Effect of Temperature and Sludge Retention Time," *Water Research*, 2004, vol. 38, pp. 983-991, Elsevier Ltd.

Mavinic, D. S., et al., "Fate of Nitrogen in Aerobic Sludge Digestion," *J. Water Pollut. Control Fed.*, 1982, vol. 54, No. 4, pp. 352-360.

Moen, G., et al., "Effect of Solids Retention Time on the Performance of Thermophilic and Mesophilic Digestion of Combined Municipal Wastewater Sludges," *Water Environment Research*, 2003, vol. 75, No. 6, pp. 539-548.

Murthy, S. N., et al., "Factors Affecting Floc Properties During Aerobic Digestion: Implications for Dewatering," *Water Environment Research*, 1999, vol. 71, No. 2, pp. 197-202.

Murthy, S. N., et al., "Optimizing Dewatering of Biosolids from Autothermal Thermophilic Aerobic Digesters (ATAD) Using Inorganic Conditioners," *Water Environment Research*, 2000, vol. 72, No. 6, pp. 714-721.

Nielsen, P. H., et al., "Changes in the Composition of Extracellular Polymeric Substances in Activated Sludge During Anaerobic Storage," *Appl. Microbiol Biotechnol.*, 1996, vol. 44, pp. 823-830, Springer-Verlag.

Novak, J. T., et al., "Mechanisms of Floc Destruction During Anaerobic and Aerobic Digestion and the Effect on Conditioning and Dewatering of Biosolids," *Water Research*, 2003, vol. 37, pp. 3136-3144, Elsevier Science Ltd.

Rasmussen, H., et al., "Iron Reduction in Activated Sludge Measured with Different Extraction Techniques," *Water Research*, 1996, vol. 30, No. 3, pp. 551-558, Elsevier Science Ltd.

Urbain, V., et al., "Bioflocculation in Activated Sludge: An Analytic Approach," *Water Research*, 1993, vol. 27, No. 5, pp. 829-838, Pergamon Press Ltd.

U.S. Environmental Protection Agency, "Acid Digestion of Sediments, Sludges, and Soils," U.S. EPA Method 3050B, 1996, pp. 1-12.

Holbrook, R. D., et al., "A Comparison of Membrane Bioreactor and Conventional-Activated-Sludge Mixed Liquor and Biosolids Characteristics," *Water Environment Research*, 2005, vol. 77, No. 4, pp. 323-330.

Abu-Orf, M., et al., "Adjusting Floc Cations to Improve Effluent Quality: The Case of Aluminum Addition at Sioux City Wastewater Treatment Facility," *Water Environment Federation*, 2004, 16 pgs.

PROCESS TO ENHANCE PHOSPHORUS REMOVAL FOR ACTIVATED SLUDGE WASTEWATER TREATMENT SYSTEMS

FIELD OF THE INVENTION

The present invention relates to the treatment of wastewaters comprising biochemical oxygen demand (BOD), nitrogen and phosphorus, such as from municipal, commercial and industrial sources. More particularly, the invention relates to an activated sludge wastewater treatment process.

BACKGROUND OF THE INVENTION

Many wastewater treatment plants use an activated sludge process to break down the organic matter in wastewater. A conventional activated sludge process typically begins with the removal of course materials such as grit, large particulate matter and other suspended solids from the wastewater. The wastewater is then sent to a primary clarifier where a sludge settles to the bottom and a clear supernatant sits on top. The sludge is removed for disposal or further treated in a digester, where a clear liquid is recycled back to the primary clarifier and unconsumed sludge is sent off for disposal. The clear supernatant from the primary clarifier is combined in an aeration tank with bacteria-laden sludge, also referred to as activated sludge, from a downstream process. The clear supernatant and activated sludge form a mixed liquor that is aerated in the aeration tank to reduce the BOD. The mixed liquor is then sent to a secondary clarifier to separate the sludge from a clear effluent. The clear effluent is removed, disinfected and typically discharged into a local waterway. A portion of the sludge is returned to the aeration tank as return activated sludge (RAS), while the remainder is usually concentrated and sent off for disposal as waste activated sludge (WAS).

Handling and disposal of WAS is typically the largest single cost component in the operation of a wastewater treatment plant. Therefore, the wastewater treatment industry would greatly benefit from a low WAS process where essentially all WAS was converted to a clear effluent that could be returned to a local water supply. One potential drawback to a low WAS treatment process, however, is the potentially high concentration of soluble phosphates left in the effluent. Phosphates are a common nutrient found in organic material making up WAS. As wastewater is subject to various treatment stages, the phosphates are either solubilized in the wastewater or taken up by microorganisms in the sludge. During a conventional activated sludge process, the phosphates are taken up by the microorganisms in the sludge and removed with the WAS. In the absence of WAS, the phosphates remain in the effluent as potential environmental pollutants. Therefore, any process that minimizes WAS should also include a process to eliminate the soluble phosphates remaining in the wastewater. Attempts have been made in the past to remove soluble phosphates from wastewater through precipitation with iron and aluminum metal salts. However, the resulting solid phosphates have settling properties similar to those of the organic solids and can be difficult to separate from the sludge in the wastewater. Additionally, such solids often become soluble at the lower pHs sometimes encountered in waste treatment processes.

SUMMARY OF THE INVENTION

In one embodiment, the invention provides a method for treating wastewater. In some embodiments, the method includes combining the wastewater with activated sludge in an activated sludge tank to form a mixed liquor, transferring the mixed liquor to a solid-liquid separator to separate the mixed liquor into a clear effluent and a sludge stream, transferring at least a portion of the sludge stream to a bioreactor, converting phosphorus in the sludge stream into soluble phosphates in the bioreactor, transferring at least a portion of the sludge stream from the bioreactor to a sidestream reactor, adding a source of multivalent metal ions to the sludge stream in the sidestream reactor to precipitate phosphate solids, separating and removing the phosphate solids from the sludge stream, and returning the sludge stream to the activated sludge tank for further treatment with the mixed liquor.

In another embodiment, the invention provides a method for removing phosphorus from a low waste activated sludge treatment process. In some embodiments, the method includes transferring a sludge stream comprising ammonia and soluble phosphates to a sidestream reactor, adding base to the sidestream reactor until the sludge stream has a pH of about 8 to about 10, adding a source of multivalent metal ions to the sidestream reactor, mixing the sludge stream in the sidestream reactor to precipitate phosphate solids, and transferring the sludge stream to a separator to remove the phosphate solids from the sludge stream.

In a further embodiment, the invention provides a method for treating wastewater. In some embodiments, the method includes combining the wastewater with activated sludge in an activated sludge tank to form a mixed liquor, transferring the mixed liquor to a solid-liquid separator to separate the mixed liquor into a clear effluent and a sludge stream, passing the sludge stream through a solids separation module to remove trash and inert solids from the sludge stream, transferring at least a portion of the sludge stream from which trash and solids were removed to a sequencing facultative digester, converting phosphorus in the sludge stream into soluble phosphates in the sequencing facultative digester, transferring at least a portion of the sludge stream from the sequencing facultative digester to a sidestream reactor, adding a source of multivalent metal ions to the sludge stream in the sidestream reactor, transferring the sludge stream in the sidestream reactor to a mechanical separator to separate the phosphate solids from the sludge stream, and returning at least a portion of the sludge stream to the activated sludge tank for further treatment with the mixed liquor.

In yet another embodiment, the invention provides a method for treating wastewater. In some embodiments, the method includes combining the wastewater with activated sludge in an anaerobic tank to form a mixed liquor, transferring the mixed liquor to an activated sludge tank where the mixed liquor is subjected to at least one of an anoxic and an anaerobic environment, transferring the mixed liquor to a solid-liquid separator to separate the mixed liquor into a clear effluent and a sludge stream, transferring at least a portion of the sludge stream to a bioreactor, converting phosphorus in the sludge stream into soluble phosphates in the bioreactor, transferring at least a portion of the sludge stream from the bioreactor to a sidestream reactor, adding a source of multivalent metal ions to the sludge stream in the sidestream reactor to precipitate phosphate solids, and separating and removing the phosphate solids from the sludge stream.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION

Figure 1:
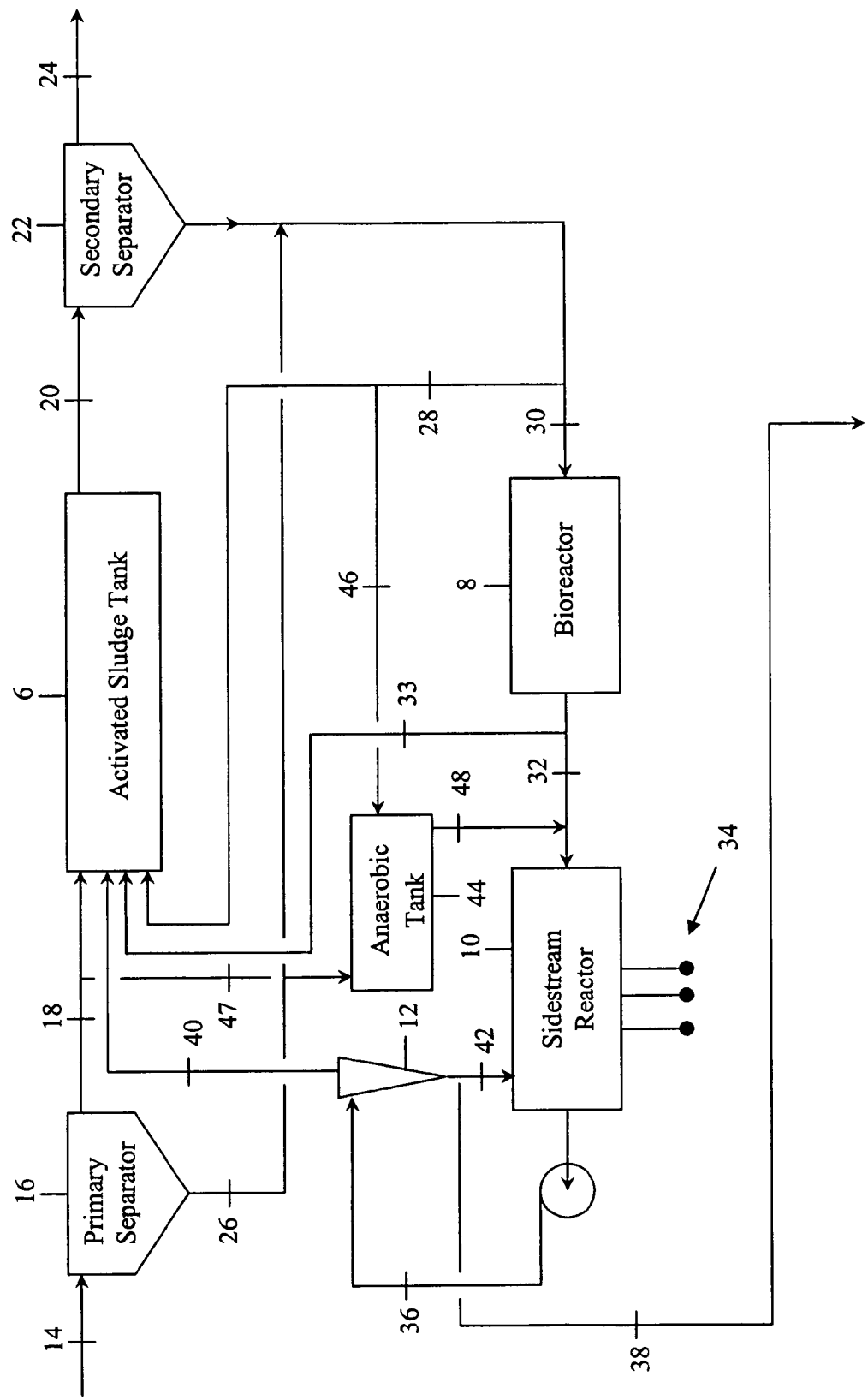
FIG. 1 is a schematic view of an improved wastewater treatment system embodying the invention.

FIG. 1 illustrates a schematic view of an improved wastewater treatment system embodying the invention. The invention employs an activated sludge tank 6 in combination with a bioreactor 8 to minimize the WAS generated by the treatment process. A sidestream reactor 10 and separator 12 remove soluble phosphates left in the wastewater by the low WAS process.

As shown in FIG. 1, contaminated wastewater comprising BOD, nitrogen and phosphorus may be optionally pretreated in a primary separator 16. Wastewater is transported by conduit 14 to the primary separator 16 where solids, such as grit and large particulate matter, are separated from a primary effluent. The primary effluent, or contaminated wastewater if no pretreatment is used, is transported by conduit 18 to an activated sludge tank 6 where it is mixed with a bacterial-laden sludge, or activated sludge, to form a mixed liquor.

The activated sludge tank 6 subjects the mixed liquor to two or more biological growth conditions that cultivate microorganisms to reduce BOD and ammonia originating from the wastewater. The activated sludge tank 6 typically comprises two or more reactor zones, each of which operates under anaerobic, anoxic or aerobic conditions. An anaerobic zone cultivates anaerobic microorganisms that thrive in an oxygen-free environment. An anoxic zone supplies oxygen to the mixed liquor at a rate less than the rate of oxygen consumption by aerobic microorganisms, thus resulting in an oxygen deficit. An aeration zone cultivates aerobic microorganisms that thrive under a continuous oxygen surplus. Although the invention should in no way be limited by scientific theory, it is believed that in the anaerobic zone microorganisms take up and store simple carbon compounds, using energy derived from the hydrolysis and release of phosphates. Anoxic zone microorganisms typically use oxygen to oxidize BOD and ammonia. When the oxygen supply is less than the demand, anoxic microorganisms can use the nitrates generated from the oxidation of ammonia to further oxidize BOD and generate nitrogen gas. Aerobic zone microorganisms oxidize BOD and simultaneously absorb and store phosphates. Aerobic zone microorganisms also oxidize ammonia.

The activated sludge tank 6 can be specifically tailored to reduce BOD and ammonia in wastewater by varying the number and sequence of reactor zones. The activated sludge tank 6 can be divided into a finite number of discrete zones defined by distinct boundaries. In one embodiment, the activated sludge tank 6 includes three reactor zones, where the mixed liquor is first subjected to an aerobic zone, then subjected to an anoxic zone, and finally subjected to an aerobic zone. In another embodiment, the activated sludge tank 6 includes two reactor zones, where the mixed liquor is first subjected to an aerobic zone followed by an anaerobic zone. In a further embodiment, the activated sludge tank 6 includes four reactor zones, where the mixed liquor is first subjected to an anaerobic zone, followed by an anoxic zone and two aerobic zones. The listed embodiments serve as examples only. It should be understood that the activated sludge tank 6 can comprise two or more reactor zones arranged in any sequence. Furthermore, the activated sludge tank 6 can run as a batch process or a continuous process.

The activated sludge tank 6 can also have a long plug flow design where there are no discrete zones and the conditions change gradually over the length of the tank. In one embodiment, the tank environment gradually transitions from an aerobic environment in the upstream end to an anoxic environment in the downstream end. In an alternative embodiment, the tank environment gradually transitions from an anaerobic environment in the upstream end, to an anoxic environment in the middle, and to an aerobic environment in the downstream end.

From the activated sludge tank 6, the mixed liquor is transferred by conduit 20 to a secondary separator 22 where solids are separated from the mixed liquor, leaving behind a sludge and a clear effluent. In the embodiment shown in FIG. 1, the activated sludge tank 6 and secondary separator 22 are separate units. In an alternative embodiment, the activated sludge tank 6 and secondary separator 22 can be combined into a sequencing batch reactor.

The secondary separator 22 is any device that separates solids from liquids by gravity, differential settling velocity, or size-exclusion. Examples of secondary separators 22 include settling ponds, clarifiers, hydrocyclones, centrifuges, and membrane filters or separators. The clear effluent is removed along path 24 and can be disinfected and then discharged into a local waterway. The remaining sludge comprising live bacteria, expired bacteria and other organic matter forms a sludge stream. As shown in FIG. 1, solids from the primary separator 16 in a pretreatment process can be added to the sludge stream by conduit 26 just downstream of the secondary separator 22.

About 80-95% of the sludge stream is diverted by conduit 28 to the activated sludge tank 6 and/or by conduits 28 and 46 to an optional anaerobic tank 44. The remainder of the sludge stream is transferred by conduit 30 to a bioreactor 8 where a second bacteria population is cultivated under one or more growth conditions to decompose the sludge in the sludge stream. A suitable bioreactor 8 is described below and in U.S. Pat. No. 6,660,163 issued to Miklos which is hereby fully incorporated by reference.

The bacteria population within the sludge stream typically comprises one or more classes of bacteria. Such classes of bacteria include, but are not limited to, obligate aerobes, facultative aerobes, nitrifiers, obligate anaerobes, and facultative anaerobes. Each bacteria performs a certain function. For example, some bacteria convert particulate BOD into soluble BOD for utilization, some reduce high solids yield organisms, and some improve nitrification/denitrification efficiency. Each bacteria also thrives within a narrow range of conditions. Aerobic bacteria thrive in an oxygen environment, anaerobic bacteria thrive in an oxygen depleted environment, and facultative bacteria can thrive in both environments. Bacteria within a population may be selectively activated by changing the growth conditions to which the population is subjected. Desired growth conditions may be achieved by effecting a selected order of aerobic, anoxic, and anaerobic conditions for varied lengths of time and repetitively controlling those conditions by measurement and reproduction of the oxidation-reduction potential (ORP), specific oxygen uptake rate (SOUR), and/or specific nitrogen uptake rate (SNUR). Therefore, within the bioreactor 8 it is possible to treat more than one component in the wastewater by selectively varying the conditions of the bioreactor 8 to sequentially activate the individual types of bacteria.

In one embodiment, the bioreactor 8 is run under anaerobic conditions to promote the growth and activity of anaerobic bacteria. Such bacteria can include obligate anaerobes and/or facultative anaerobes. Under anaerobic conditions, the bacteria that accumulated quantities of phosphorus in excess of that required for simple cell growth and reproduction during aeration, now take up and store simple carbon compounds, using energy derived from the hydrolysis and release of phosphates. When the sludge stream is eventually returned to the activated sludge tank 6, these bacteria are able to metabolize the absorbed carbon compounds in an aerobic zone.

In a second embodiment, the bioreactor 8 is a sequencing facultative digester (SFD) favoring a low solids yield. Within an SFD, the sludge stream comprising facultative bacteria is subjected to a sequence of anaerobic and anoxic conditions that contribute to breaking down the organic matter in the waste treatment process. The SFD can operate as a batch process, where the entire contents of the SFD are under anoxic conditions or anaerobic conditions at a single moment. Alternatively, the SFD can operate as a continuous process where the SFD is divided into separate compartments, each compartment operating under anoxic or anaerobic conditions. The sequence of conditions may take on any order. However, the sequence typically ends under anaerobic conditions where the bacteria release phosphates and take up and store simple carbon compounds that serve as food during an aerobic phase in the activated sludge tank 6.

After processing in the bioreactor 8, the sludge stream may be recycled to the activated sludge tank 6 by conduits 33. In addition to, or alternatively, the sludge stream may be sent to the sidestream reactor 10 where soluble phosphates are precipitated from the sludge stream as solid phosphates. Treatment within the sidestream reactor 10 includes adjusting the pH of the sludge stream to slightly alkaline and providing a source of multivalent metal ions to precipitate the phosphorus. Any multivalent metal ion that forms an insoluble phosphate having a specific gravity greater than the organic matter making up the sludge can be used. Preferably, the multivalent metal ions comprises calcium and/or magnesium. Additionally, other reagents, such as ammonia, may be added as needed to form the desired solid phosphate. In some embodiments, such as the illustrated embodiment of FIG. 1, reagents are fed into the sidestream reactor 10 through a series of conduits 34. For example, one conduit 34 may supply a base to adjust the pH of the sludge stream. Another conduit 34 may supply a multivalent metal ion used to precipitate the phosphate. Yet another may supply a source of ammonia or raw wastewater. A mechanical mixer (not shown) can be used to insure adequate mixing of all materials. The sidestream reactor 10 may operate as a continuous, semi-continuous or batch process, and may be employed continuously or periodically. In the case of periodic use, the level of soluble phosphates in the sludge stream is allowed to build up over a period of time before the sludge stream is diverted to the sidestream reactor 10 for treatment.

In one preferred embodiment, soluble phosphates are precipitated in the sidestream reactor 10 as struvite, $MgNH_4PO_4 \cdot 6H_2O$. Favorable reaction conditions require a slightly alkaline sludge stream and an adequate source of magnesium ions and ammonium ions. Since the pH of the sludge stream is usually neutral when it leaves the bioreactor 8, a standard base such as, but not limited to, NaOH, KOH, $NH_4OH$ and $Mg(OH)_2$ may be added. Typically, the pH of the sludge stream in the sidestream reactor 10 is adjusted to about 8 to about 10. More preferably the pH is adjusted to about 8.5 to about 9.5. In addition to adjusting the pH, a source of magnesium ion must be present in the sludge stream. The amount of magnesium ion required is about 100% to about 120% the stoichiometric amount. More preferably the amount of magnesium ion is about 110% the stoichiometric amount. If a sufficient source of magnesium ion exists in solution, no further source need be added. Otherwise, a source of magnesium ion such as, but not limited to, $MgCl_2$, $MgHCO_3$, MgO, $MgSO_4$, and $Mg(OH)_2$ may be added. Finally, a source of ammonium ion is required. Many sludge streams by nature have a high ammonia content that can provided an adequate source of ammonium ions. However, if necessary, raw wastewater or other sources of ammonia such as, but not limited to, $NH_4OH$ and $NH_4Cl$ may be added to the sidestream reactor 10 to provide a sufficient concentration of ammonium ions. The amount of ammonium in the sludge stream is preferably about 100% to about 120% the stoichiometric amount. The contents of the sidestream reactor 10 are mechanically mixed for about 20 minutes to about 2 hours. Soluble phosphates precipitate out of the sludge stream as struvite, $MgNH_4PO_4 \cdot 6H_2O$.

In a second preferred embodiment, soluble phosphates are precipitated in the sidestream reactor 10 as calcium phosphate, $Ca_3(PO_4)_2$. Favorable reaction conditions require a slightly alkaline sludge stream and an adequate source of calcium ions. Since the pH of the sludge stream is usually neutral when it leaves the bioreactor 8, a standard base such as, but not limited to, NaOH, KOH, $NH_4OH$ and $Mg(OH)_2$ may be added. Typically, the pH of the sludge stream in the sidestream reactor 10 is adjusted to about 8 to about 10. More preferably the pH is adjusted to about 8.5 to about 9.5. In addition to adjusting the pH, a source of calcium ions must be present in the sludge stream. The amount of calcium ions required is about 100% to about 120% the stoichiometric amount. More preferably the amount of calcium ions is about 110% the stoichiometric amount. If a sufficient source of calcium ions exists in solution, no further source need be added. Otherwise, a source of calcium ions including, but not limited to, $CaCl_2$ and $Ca(OH)_2$ may be added. The contents of the sidestream reactor 10 are mechanically mixed for about 20 minutes to about 2 hours. Soluble phosphates precipitate out of the sludge stream as calcium phosphate, $Ca_3(PO_4)_2$.

The contents of the sidestream reactor 10 are then pumped by conduit 36 to one or more separators 12 to remove solid phosphates without significant removal of organic matter having specific gravities less than that of the solid phosphates. The solid phosphates can be separated from the sludge stream based upon differential settling velocity using any number of mechanical means, including but not limited to, a gravity separator, a hydrocyclone and a centrifuge. The solid phosphates can then be discharged along path 38 as a concentrated sludge stream relatively low in biological solids. The remainder of the sludge stream can be recycled back to the activated sludge tank 6 by conduit 40 for further treatment. In addition to, or alternatively, a portion of the sludge stream can be returned to the sidestream reactor 10 by conduit 42 to facilitate the formation of larger crystals by having the crystals formed earlier acting as seeds for the formation of larger crystals.

In some embodiments, an anaerobic tank 44 can be added to the system if the bioreactor 8 by itself does not cause the microorganisms to sufficiently release phosphates back into solution. A portion of the sludge stream can be diverted around the bioreactor 8 by conduits 28 and 46 to the anaerobic tank 44, where microorganisms take up simple carbon compounds using energy derived from the hydrolysis and release of phosphates. Optionally, conduit 47 can supply raw feed to the anaerobic tank 44 to enhance the release of phosphates. The sludge stream exits the anaerobic tank 44 by conduit 48 and combines with the sludge stream from the bioreactor 8 just upstream of the sidestream reactor 10.

Figure 2:
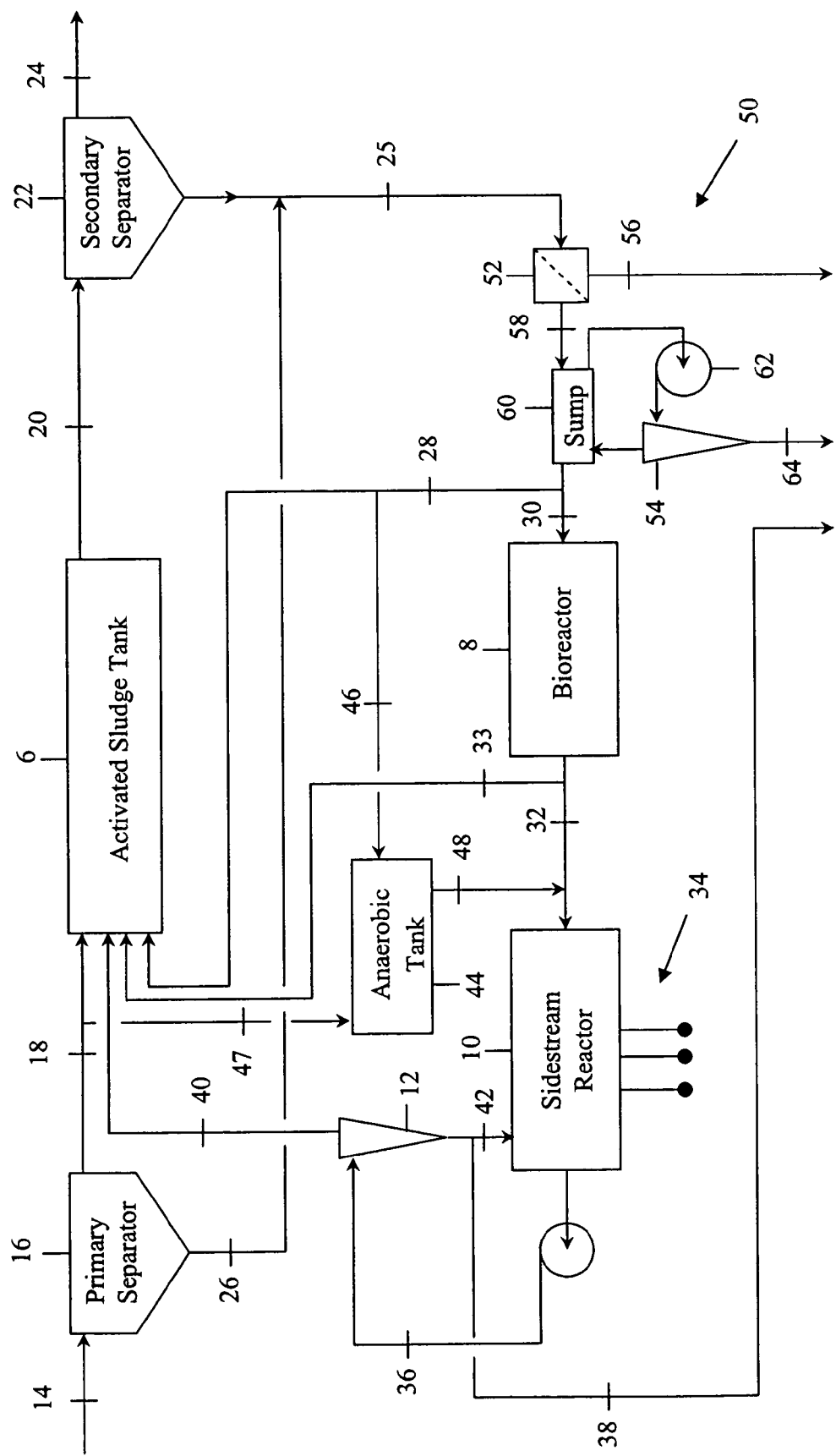
FIG. 2 is a schematic view of an alternative embodiment of the improved wastewater treatment system in FIG. 1.

In a second embodiment of the invention, as shown in FIG. 2, the sludge stream may optionally pass through a solids separation module 50. Wastewater typically comprises a variety of solids, including small organic materials such as waste-digestive organisms critical to waste treatment, larger organic matter such as trash, and small and large inorganic particles such as sand. Removal of trash and inorganic solids from the wastewater substantially increases the efficiency of the waste treatment process. Therefore, it is often beneficial to include a solids separation module 50 in the treatment process. A suitable solids separation module 50 is described below and in U.S. Pat. Nos. 5,658,458, 5,626,755 and 5,824,222 issued to Keyser et al. which is hereby fully incorporated by reference.

A suitable solids separation module 50 includes one or more screens 52, in series or parallel, having a suitable opening size to remove large organic and inorganic particles, and one or more mechanical separators 54, in series or parallel, for removing small inorganic particles similar in size to the microorganisms but having a higher specific gravity. The solids separation module removes from the treated sludge stream suspended inert organic and inorganic particles without significant removal of biological solids larger in size than at least some of the removed inert particles. Examples of screens 52 include, but are not limited to, drum screens and flat screens. Examples of mechanical separators 54 include, but are not limited to, a gravity separator, a hydrocyclone and a centrifuge. The order of the screens 52 and mechanical separators 54 in the process is not critical.

In one embodiment, as illustrated in the embodiment of FIG. 2, the sludge stream flows through a screen 52 in the solids separation module 50. The screen 52 blocks passage of large inorganic and organic matter which is later removed as solid waste along path 56. The sludge stream is then fed by conduit 58 to a sump 60. A pump 62 transfers the sludge stream from the sump 60 to the mechanical separator 54. Small, inert solids are separated from the sludge stream and removed from the solids separation module 50 along path 64 as solid waste. The remainder of the sludge stream is returned to the sump 60 where it can be transported by conduit 28 to the activated sludge tank 6, sent by conduit 30 to the bioreactor 8, or pumped back through the mechanical separator 54. In some embodiments, such as the illustrated embodiment in FIG. 2, the solids separation module 50 is located between the secondary separator 22 and the bioreactor 8. However, the solids separation module 50 may be located elsewhere downstream of the activated sludge tank 6. Although the solids separation module 50 illustrated in FIG. 2 shows one screen 52 and one mechanical separator 54, it should be understood that the separation module 50 can be made up of one or more screens, one or more mechanical separators, or any combination of screens and mechanical separators.

Figure 3:
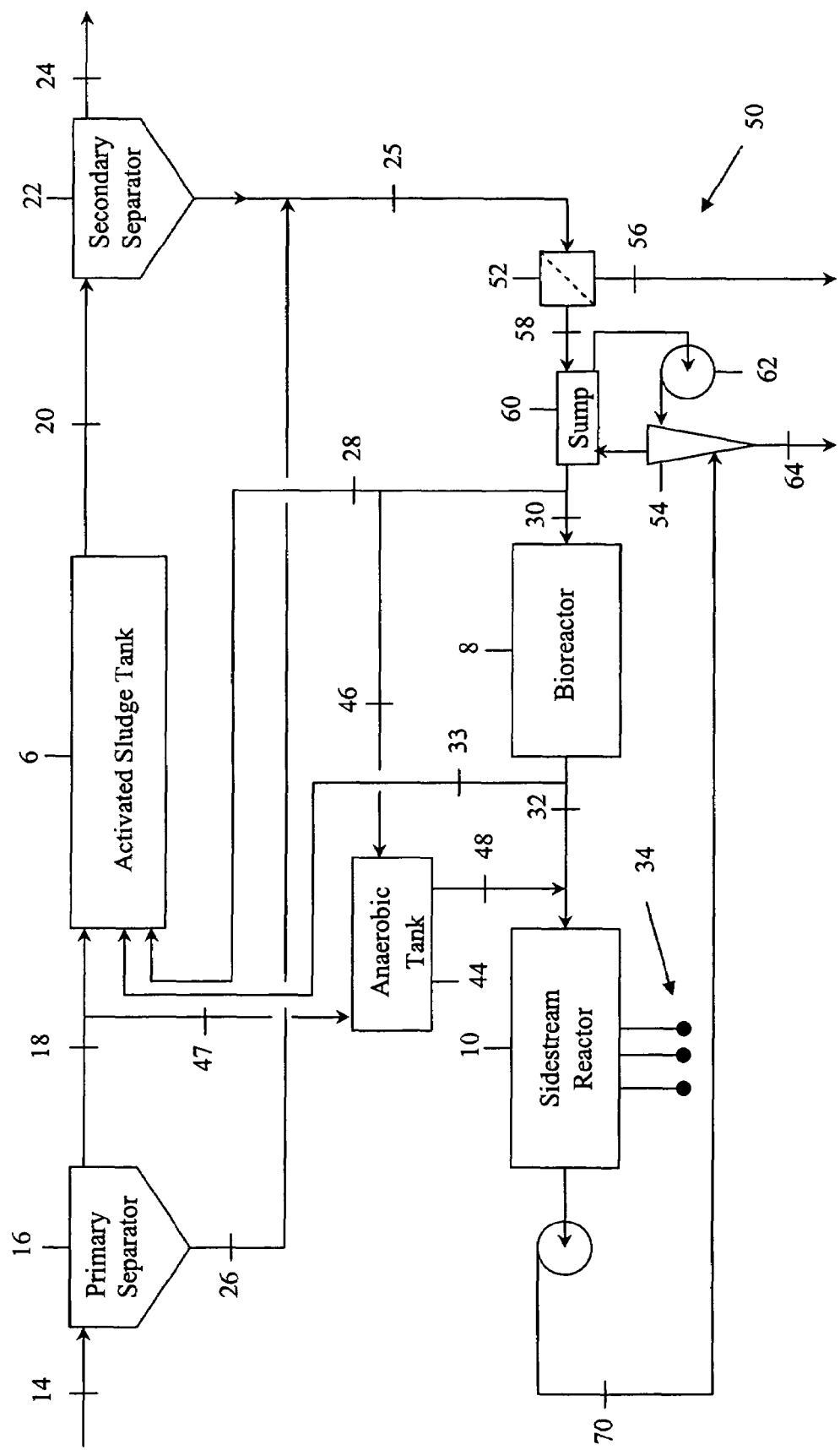
FIG. 3 is a schematic view of an alternative embodiment of the improved wastewater treatment system in FIG. 2.

In a further embodiment of the invention, such as the illustrated embodiment of FIG. 3, the mechanical separator 54 used to remove small inorganic particles from the sludge stream may also be used to separate the solid phosphates from the sludge stream. The sludge stream from the sidestream reactor 10 is sent by conduit 70 to the mechanical separator 54 contained within the solids separation module 50. The solid phosphates are separated from the sludge stream and disposed as solid waste along path 64. A portion of the sludge stream can be returned by conduit 28 to the activated sludge tank 6, a second portion can be sent by conduit 30 to the bioreactor 8, and a third portion can be recycled through the mechanical separator 54.

Figure 4:
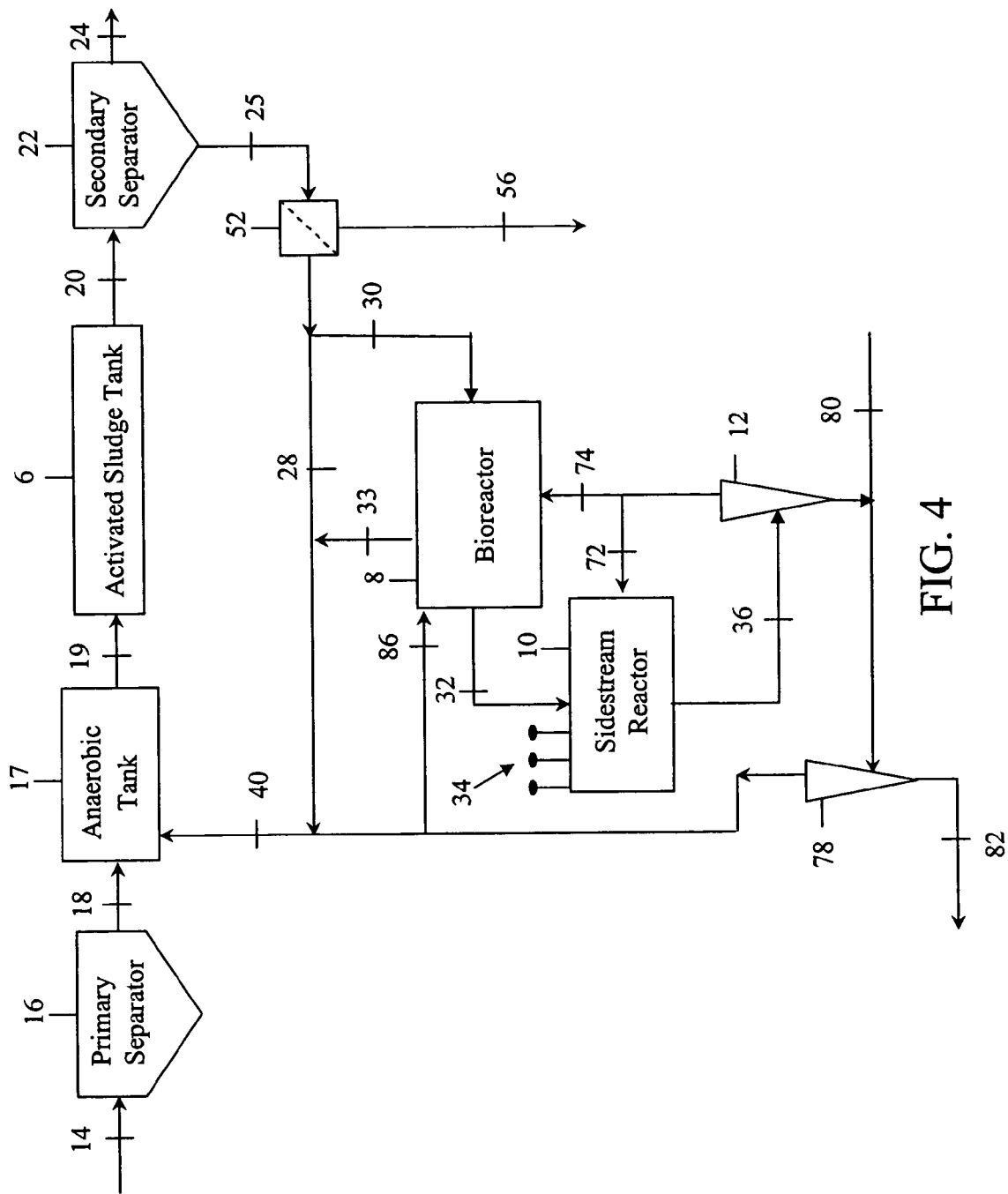
FIG. 4 is a schematic view of another alternative embodiment of the improved wastewater treatment system in FIG. 1.

In yet another embodiment of the invention, as illustrated in FIG. 4, an anaerobic tank 17 is added upstream of the activated sludge tank 6. The anaerobic tank 17 forces biological organisms to release phosphorus into the waste stream. When the waste stream is subjected to an aerobic zone in the activated sludge tank 6 further downstream, the biological organisms exhibit a marked increase in the uptake of phosphorus when compared to biological organisms without prior anaerobic treatment. This enhanced uptake reduces the amount of soluble phosphates in the mixed liquor and increases the amount of phosphorus separated out with the sludge in the secondary separator 22.

The sludge stream from the secondary separator 22 is passed through one or more screens 52, in series or parallel, having a suitable opening size to remove large organic and inorganic particles. Examples of screens 52 include, but are not limited to, drum screens and flat screens. About 80-95% of the sludge stream is then sent by conduits 28 and 40 to the anaerobic tank 17 as RAS. The remainder is sent to the bioreactor 8 where the biological organisms are once again forced to release phosphorus into solution. After processing in the bioreactor 8, the sludge stream may be recycled to the anaerobic tank 17 by conduits 33 and 40. In addition to, or alternatively, the sludge stream may be sent to the sidestream reactor 10 where soluble phosphates are precipitated from the sludge stream as solid phosphates.

The solid phosphates are removed from the sludge stream using one or more separators that include, but are not limited to, gravity separators, hydrocyclones and a centrifuge. In the embodiment illustrated in FIG. 4, the contents of the sidestream reactor 10 are passed through a first separator 12 to produce an overflow and an underflow. The overflow, which includes predominately water and organic matter, is recycled back to the sidestream reactor 10, the bioreactor 8, or a combination of both. The underflow, which includes primarily solid phosphates, other inert solids, grit, and some organic matter, is mixed with plant dilution or elutriate water by conduit 80 to lower the viscosity of the underflow. The underflow is then passed through a second separator 78 to remove most of the organic matter and concentrate the inert solids. The inert solids are dewatered and easily disposed, for example, in conjunction with normal screenings from screen 52. The organic matter is returned to the anaerobic tank by conduit 40, the bioreactor 8 by conduit 86, or a combination of both.

Although the embodiment in FIG. 4 shows a separate anaerobic tank 17 and activated sludge tank 6, in theory the two could be combined into one tank. For example, the activated sludge tank 6 could have a first anaerobic zone, followed by one or more aerobic zones.

Figure 5:
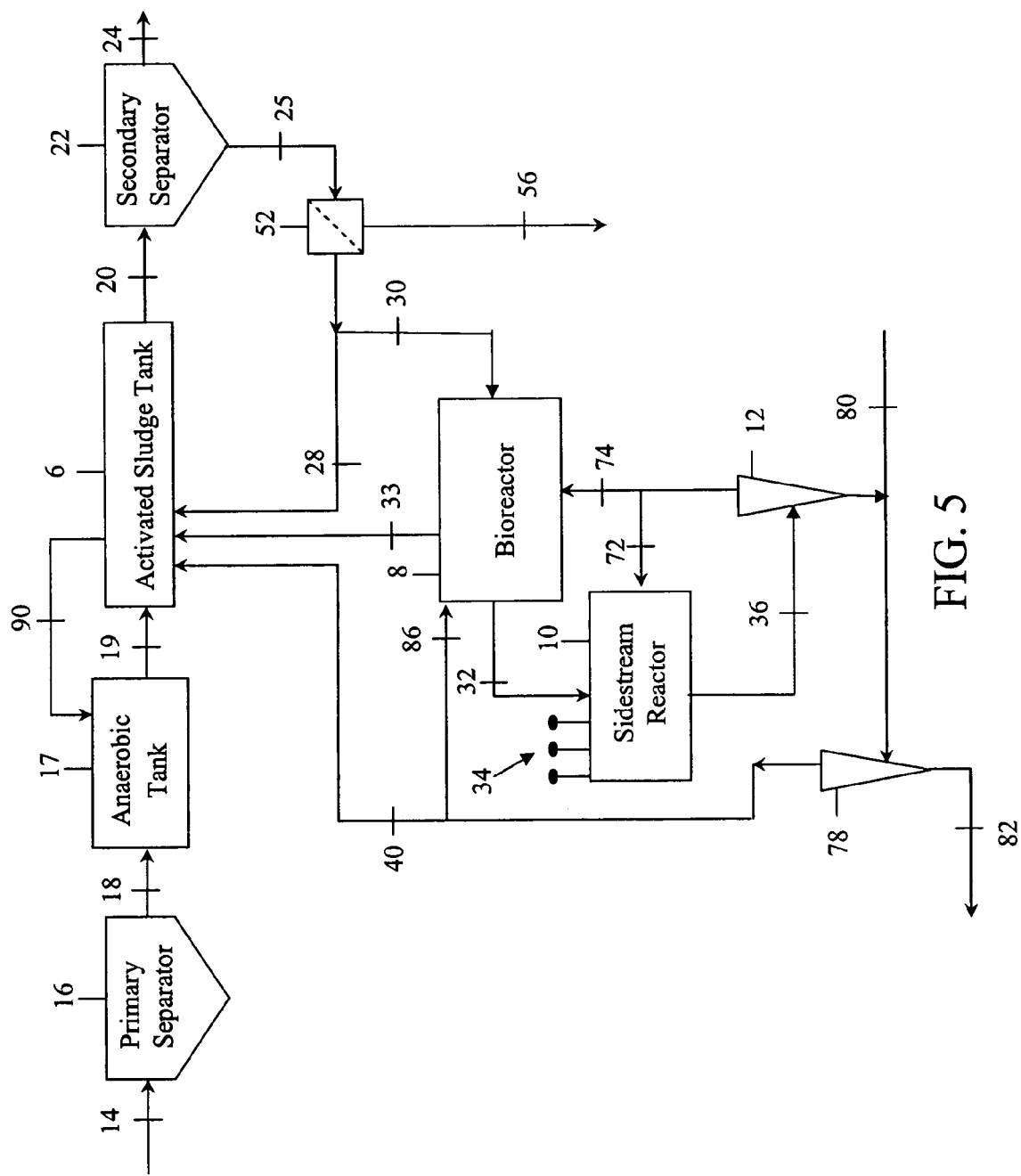
FIG. 5 is a schematic view of an alternative embodiment of the improved wastewater treatment system in FIG. 4.

In an alternative embodiment, as illustrated in FIG. 5, RAS is sent to the activated sludge tank 6, rather than the anaerobic tank 17, by conduits 28, 33 and 40. In one embodiment, RAS is fed to an oxygen-deficient zone within the activated sludge tank 6 to form a denitrified liquor. The denitrified liquor from the oxygen-deficient zone may be recycled to the anaerobic tank 17 by conduit 90 for mixing therein with wastewater and/or transferred to an oxygen-surplus zone within the activation tank 6 before being sent by conduit 20 to the secondary separator 22.

Various features and advantages of the invention are set forth in the following claims.

We claim:

1. A method for treating wastewater comprising:
    combining the wastewater with activated sludge in an activated sludge tank to form a mixed liquor;
    transferring the mixed liquor to a solid-liquid separator to separate the mixed liquor into a clear effluent and a sludge stream;
    transferring at least a portion of the sludge stream to a bioreactor;
    converting phosphorus in the sludge stream into soluble phosphates in the bioreactor;
    transferring at least a portion of the sludge stream from the bioreactor to a sidestream reactor;
    adding a source of multivalent metal ions to the sludge stream in the sidestream reactor to precipitate phosphate solids;
    separating and removing the phosphate solids from the sludge stream; and
    returning the sludge stream to the activated sludge tank for further treatment with the mixed liquor.

2. The method of claim 1, wherein the mixed liquor within the activated sludge tank is subjected to an aerobic environment.

3. The method of claim 1, wherein the mixed liquor within the activated sludge tank is subjected to an anaerobic environment followed by at least one of an anoxic environment and an aerobic environment.

4. The method of claim 1, wherein the bioreactor comprises a facultative sequencing digester.

5. The method of claim 1, wherein the multivalent metal ions are selected from the group consisting of $Mg^{2+}$ and $Ca^{2+}$.

6. The method of claim 1, wherein the source of multivalent metal ions is selected from the group consisting of $MgCl_2$, $MgHCO_3$, $MgO$, $MgSO_4$, and $Mg(OH)_2$.

7. The method of claim 1, wherein the phosphate solids are selected from the group consisting of struvite and calcium phosphate.

8. The method of claim 1, wherein the phosphate solids comprise struvite.

9. The method of claim 1, wherein the sludge stream in the sidestream reactor has a pH of about 8 to about 10.

10. The method of claim 1, wherein the sludge stream in the sidestream reactor has a pH of about 8.5 to about 9.5.

11. The method of claim 1, wherein the phosphate solids are separated from the sludge stream by mechanical means based upon differential settling velocity.

12. The method of claim 1, wherein the phosphate solids are separated from the sludge stream by at least one of a gravity separator, a hydrocyclone and a centrifuge.

13. The method of claim 1, wherein separating and removing the phosphate solids from the sludge steam occurs without significant removal of organic matter having a specific gravity less than that of the phosphate solids.

14. The method of claim 1, wherein the method is one of a batch process and a continuous process.

15. A method for removing phosphorus from a low waste activated sludge treatment process comprising:
    transferring a sludge stream comprising ammonia and soluble phosphates to a sidestream reactor;
    adding base to the sidestream reactor until the sludge stream has a pH of about 8 to about 10;
    adding a source of multivalent metal ions to the sidestream reactor;
    mixing the sludge stream in the sidestream reactor to precipitate phosphate solids; and
    transferring the sludge stream to a separator to remove the phosphate solids from the sludge stream.

16. The method of claim 15, wherein the multivalent metal ions are selected from the group consisting of $Mg^{2+}$ and $Ca^{2+}$.

17. The method of claim 15, wherein the source of multivalent metal ions is added in stoichiometric excess.

18. The method of claim 15 further comprising adding an additional source of ammonia to the sludge stream in the sidestream reactor.

19. The method of claim 15, wherein the sludge stream is mixed for about 20 minutes to about 2 hours.

20. The method of claim 15, wherein the phosphate solids are selected from the group consisting of struvite and calcium phosphate.

21. The method of claim 15, wherein the phosphate solids are removed from the sludge stream by at least one of a gravity separator, a hydrocyclone and a centrifuge.

22. The method of claim 15, wherein at least a portion of the separated phosphate compounds are recycled back to the sidestream reactor to seed the sludge stream.

23. A method for treating wastewater comprising:
    combining the wastewater with activated sludge in an activated sludge tank to form a mixed liquor;
    transferring the mixed liquor to a solid-liquid separator to separate the mixed liquor into a clear effluent and a sludge stream;
    passing the sludge stream through a solids separation module to remove trash and inert solids from the sludge stream;
    transferring at least a portion of the sludge stream from which trash and solids were removed to a sequencing facultative digester;
    converting phosphorus in the sludge stream into soluble phosphates in the sequencing facultative digester;
    transferring at least a portion of the sludge stream from the sequencing facultative digester to a sidestream reactor;
    adding a source of multivalent metal ions to the sludge stream in the sidestream reactor;
    transferring the sludge stream in the sidestream reactor to a mechanical separator to separate the phosphate solids from the sludge stream; and
    returning at least a portion of the sludge stream to the activated sludge tank for further treatment with the mixed liquor.

24. The method of claim 23, wherein passing the sludge stream through a solids separation module removes from the sludge stream suspended inert organic and inorganic particles without significant removal of biological solids larger in size than at least some of the removed inert particles.

25. The method of claim 23, wherein the sludge stream in the sidestream reactor has a pH of about 8 to about 10.

26. The method of claim 23, wherein the sludge stream in the sidestream reactor is mixed for about 20 minutes to about 2 hours to precipitate phosphate solids.

27. The method of claim 23, wherein the solids separation module comprises a screen.

28. The method of claim 23, wherein the solids separation module comprises a mechanical separator.

29. The method of claim 23, wherein the solids separation module comprises a screen and a mechanical separator.

30. The method of claim 28, wherein the mechanical separator is selected from a group consisting of a gravity separator, a hydrocyclone and a centrifuge.

31. The method of claim 28, wherein the same mechanical separator is used to separate inert solids and phosphate solids from the sludge stream.

32. The method of claim 23, wherein the method is one of a batch process and a continuous process.

33. A method for treating wastewater comprising:
combining the wastewater with activated sludge in an anaerobic tank to form a mixed liquor;
transferring the mixed liquor to an activated sludge tank where the mixed liquor is subjected to at least one of an anoxic and an anaerobic environment;
transferring the mixed liquor to a solid-liquid separator to separate the mixed liquor into a clear effluent and a sludge stream;
transferring at least a portion of the sludge stream to a bioreactor;
converting phosphorus in the sludge stream into soluble phosphates in the bioreactor;
transferring at least a portion of the sludge stream from the bioreactor to a sidestream reactor;
adding a source of multivalent metal ions to the sludge stream in the sidestream reactor to precipitate phosphate solids; and
separating and removing the phosphate solids from the sludge stream.

34. The method of claim 33, wherein the sludge stream is passed through at least one screen to remove large inorganic and organic particles prior to processing in the bioreactor.

35. The method of claim 33, wherein a first separator and a second separator arranged in series are used to separate phosphate solids from the sludge stream without significant removal of organic matter having a specific gravity less than that of the phosphate solids.

36. The method of claim 35, wherein the first separator divides the sludge stream into an overflow and an underflow comprising phosphate solids; and the underflow is then diluted with water and passed through the second separator where phosphate solids are separated from the underflow.

37. The method of claim 35, wherein the separators are selected from the group consisting of a gravity separator, a hydrocyclone and a centrifuge.

38. The method of claim 33, wherein the bioreactor comprises a facultative sequencing digester.

39. The method of claim 33, wherein the multivalent metal ions are selected from a group consisting of $Mg^{2+}$ and $Ca^{2+}$.

40. The method of claim 33, wherein the phosphate solids are selected from the group consisting of struvite and calcium phosphate.

41. The method of claim 33, wherein the phosphate solids comprise struvite.

42. The method of claim 33, wherein the sludge stream in the sidestream reactor has a pH of about 8 to about 10.

43. The method of claim 33, wherein the method is one of a batch process and a continuous process.

44. The method of claim 33, further comprising combining the sludge stream from which the phosphate solids have been removed with the wastewater in the anaerobic tank.

45. The method of claim 33, further comprising combining the sludge stream from which the phosphate solids have been removed with the mixed liquor in the activated sludge tank.

46. The method of claim 45, wherein the sludge stream is combined with the mixed liquor in an oxygen-deficient zone within the activated sludge tank to form a denitrified liquor.

47. The method of claim 46, wherein the denitrified liquor is recycled to the anaerobic tank for mixing with the wastewater.

* * * * *